(12) United States Patent
Zhang et al.

(10) Patent No.: US 7,745,967 B2
(45) Date of Patent: Jun. 29, 2010

(54) COOLING FAN

(75) Inventors: Qiang Zhang, Shenzhen (CN); Zhi-Ya Yang, Shenzhen (CN); Wun-Chang Shih, Taipei Hsien (TW); Yi-Chyng Fang, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/959,280

(22) Filed: Dec. 18, 2007

(65) Prior Publication Data

US 2009/0079303 A1 Mar. 26, 2009

(30) Foreign Application Priority Data

Sep. 21, 2007 (CN) .......................... 2007 1 0077333

(51) Int. Cl.
*H02K 5/10* (2006.01)
*H02K 5/16* (2006.01)
(52) U.S. Cl. .......................................... 310/85; 310/80
(58) Field of Classification Search ............... 310/67 R, 310/90, 85; 384/119, 132; 417/353
See application file for complete search history.

(56) References Cited

U.S. PATENT DOCUMENTS

| | | | |
|---|---|---|---|
| 4,199,052 A * | 4/1980 | Morris | ....................... 198/500 |
| 5,407,281 A | 4/1995 | Chen | |
| 5,908,247 A | 6/1999 | Leuthold et al. | |
| 6,084,328 A * | 7/2000 | Yamashita et al. | ............. 310/90 |
| 6,554,474 B2 * | 4/2003 | Saito et al. | ................... 384/107 |
| 6,554,478 B2 * | 4/2003 | Hsieh | .......................... 384/130 |
| 6,707,199 B2 * | 3/2004 | Chang et al. | ................... 310/90 |
| 6,756,714 B2 * | 6/2004 | Alex et al. | ...................... 310/90 |

(Continued)

FOREIGN PATENT DOCUMENTS

| | | | |
|---|---|---|---|
| CN | 85105873 A | | 8/1985 |
| CN | 200520061100.1 | | 8/2006 |
| JP | 2005195373 A | * | 7/2005 |
| JP | 2007-189832 A | | 7/2007 |

OTHER PUBLICATIONS

Machine Translation JP2005-195373A.*
Machine Translation JP2005195373 (2005).*

*Primary Examiner*—Quyen Leung
*Assistant Examiner*—Jose A Gonzalez Quinones
(74) *Attorney, Agent, or Firm*—Jeffrey T. Knapp (57) ABSTRACT

A cooling fan includes a fan housing (10) having a central tube (102) extending upwardly therefrom, a bearing (40) received in the central tube, a stator (20) mounted around the central tube, a rotor (30), and a cover (50). The bearing defines a bearing hole (47) therein. The rotor includes a hub (32), a plurality of blades (34) extending outwardly from the hub, and a shaft (36) extending downwardly from the hub into the bearing hole of the bearing. The cover is mounted around the shaft and arranged on the bearing to seal a top end of the bearing. The cover is made of powders by sintering and thus has a plurality of pores to generate capillary force to absorb lubricant oil leaking out of the bearing.

12 Claims, 6 Drawing Sheets

U.S. PATENT DOCUMENTS

| | | |
|---|---|---|
| 6,954,017 B2* | 10/2005 | Takahashi et al. ............. 310/85 |
| 2003/0143086 A1 | 7/2003 | Shih et al. |
| 2003/0161559 A1* | 8/2003 | Kurobe et al. ............... 384/119 |
| 2003/0222522 A1 | 12/2003 | Chang et al. |
| 2006/0255674 A1* | 11/2006 | Chen et al. .................... 310/90 |
| 2007/0076992 A1* | 4/2007 | Hong et al. ................. 384/119 |
| 2008/0073991 A1* | 3/2008 | Shih et al. ..................... 310/90 |
| 2008/0218018 A1* | 9/2008 | Zhang et al. ................. 310/90 |

* cited by examiner

COOLING FAN

BACKGROUND OF THE INVENTION

1. Field of the Invention

The present invention relates to a cooling fan, and more particularly relates to a cooling fan having good lubricating characteristics.

2. Description of Related Art

With the continuing development of the electronic technology, electronic packages such as CPUs (central processing units) are generating more and more heat that requires immediate dissipation. Cooling fans are commonly used in combination with heat sinks for cooling the CPUs. Cooling fan performance mostly depends on performance characteristics of a bearing used thereby.

Figure 6:
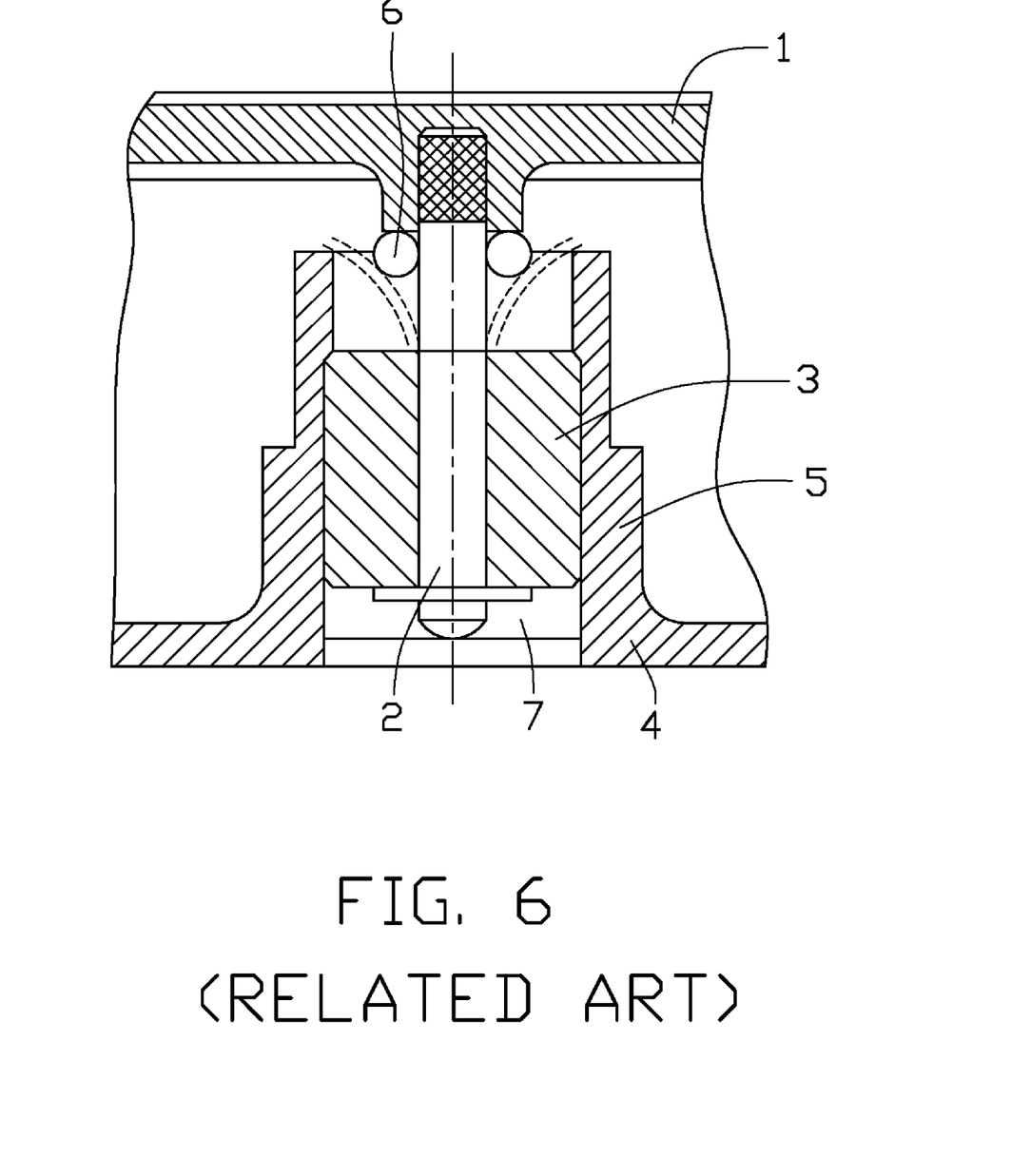
FIG. 6 is a cross-sectional view of a conventional cooling fan.

Referring to FIG. 6, a conventional cooling fan includes a rotor 1 having a shaft 2 extending downwardly from a central portion of the rotor 1, a bearing 3 defining an inner hole for receiving the shaft 2 therein, and a frame 4. A central tube 5 extends upwardly from a middle portion of the frame 4 and defines a through hole 7 therein. The bearing 3 impregnated with lubricant oil is secured in the through hole 7 of the central tube 5 to rotatably support the rotor 1. An oil retaining ring 6 is mounted around the shaft 2 and located above a top end of the bearing 3 when the cooling fan is assembled. A gap is defined between a circumferential surface of the oil retaining ring 6 and an inner circumference of a top end of the central tube 5. During operation of the cooling fan, the oil originating from the bearing 3 passes out through the gap and is lost. Lubrication of the bearing 3 is thus gradually diminished. The friction between the shaft 2 and the bearing 3 increases, resulting in noise or malfunctioning. Finally the performance of the cooling fan is reduced, and the life-span is shortened in result.

What is needed, therefore, is a cooling fan which can reduce or eliminate lubricant oil loss.

SUMMARY OF THE INVENTION

According to a preferred embodiment of the present invention, a cooling fan includes a fan housing having a central tube extending upwardly therefrom, a bearing received in the central tube, a stator mounted around the central tube, a rotor, and a cover. The bearing defines a bearing hole therein. The rotor includes a hub, a plurality of blades extending outwardly from the hub, and a shaft extending downwardly from the hub into the bearing hole of the bearing. The cover is mounted around the shaft and arranged on the bearing to seal a top end of the bearing. The cover is made of powders by sintering and thus has a plurality of pores to generate capillary force to absorb lubricant oil leaking out of the bearing during rotation of the cooling fan.

Other advantages and novel features of the present invention will be drawn from the following detailed description of the preferred embodiments of the present invention with attached drawings, in which:

BRIEF DESCRIPTION OF THE DRAWINGS

Many aspects of the present cooling fan can be better understood with reference to the following drawings. The components in the drawings are not necessarily drawn to scale, the emphasis instead being placed upon clearly illustrating the principles of the present cooling fan. Moreover, in the drawings, like reference numerals designate corresponding parts throughout the several views.

DETAILED DESCRIPTION OF THE INVENTION

Figure 1:
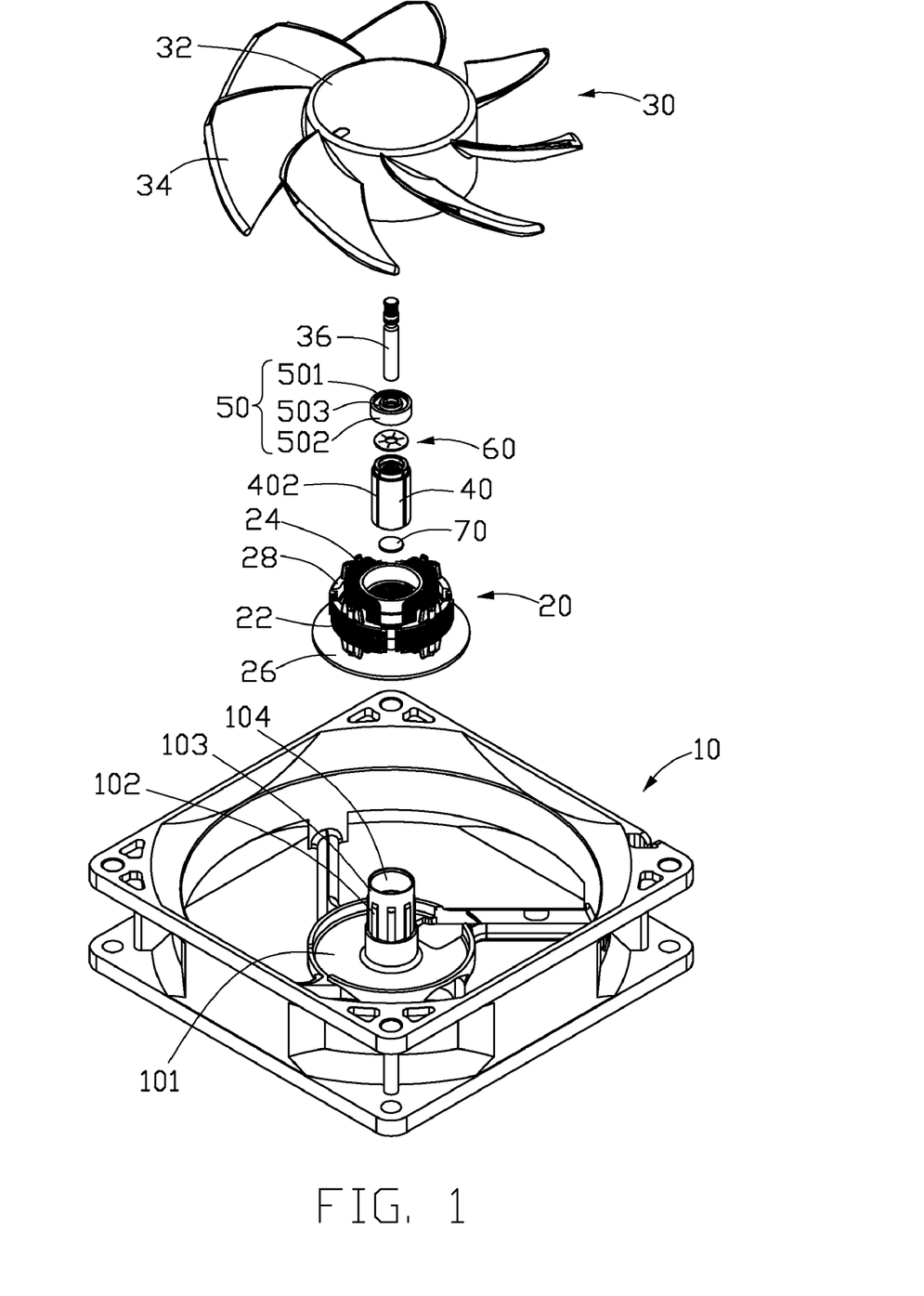
FIG. 1 is an isometric, exploded view of a cooling fan in accordance with a preferred embodiment of the present invention.
Figure 2:
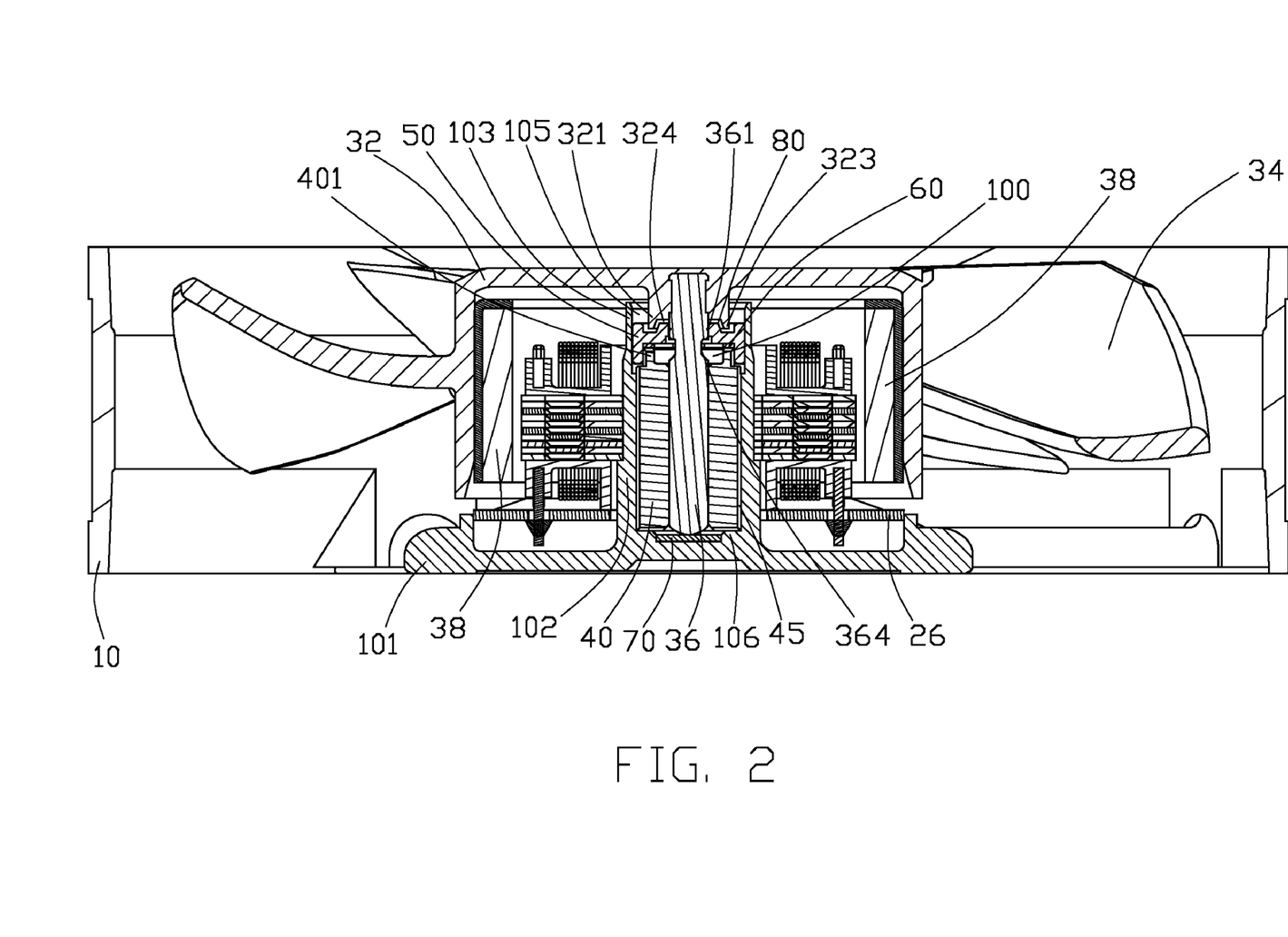
FIG. 2 is an assembled, cross-sectional view of the cooling fan of FIG. 1.

Referring to FIGS. 1 and 2, a cooling fan according to a preferred embodiment includes a fan housing 10, a bearing 40, a cover 50, a rotor 30, and a stator 20 in respective to which the rotor 30 is rotatable.

The fan housing 10 includes a base 101 and a central tube 102 extending upwardly from a central portion of the base 101. The central tube 102 defines a central hole 104 therein and forms an open end at a top portion 103 thereof. An annular recess 105 is formed on an inner circumference of the top portion 103 of the central tube 102. The recess 105 communicates with the central hole 104. Thus the top portion 103 of the central tube 102 has an inner diameter larger than that of the other portion of the central tube 102. A bottom end of the central tube 102 is closed. An annular step 106 extends inwardly from the inner circumference of the bottom end of the central tube 102.

The stator 20 is mounted around the central tube 102 of the fan housing 10. The stator 20 includes a stator core 22 consisting of layered yokes. Each yoke (not labeled) includes an annular main body and a plurality of claws extending radially and outwardly from the main body. Stator coils 24 wind on the claws of the stator core 22 to establish an alternating magnetic field. A PCB 26 (Printed Circuit Board) is electrically connected with the coils 24 to control electrical current flowing through the coils 24. To avoid the coils 24 from coming into electrical contact with the stator core 22, upper and lower insulating frames 28 are used to cover 50 the stator core 22 and electrically insulate the coils 24 from the stator core 22.

Figure 4:
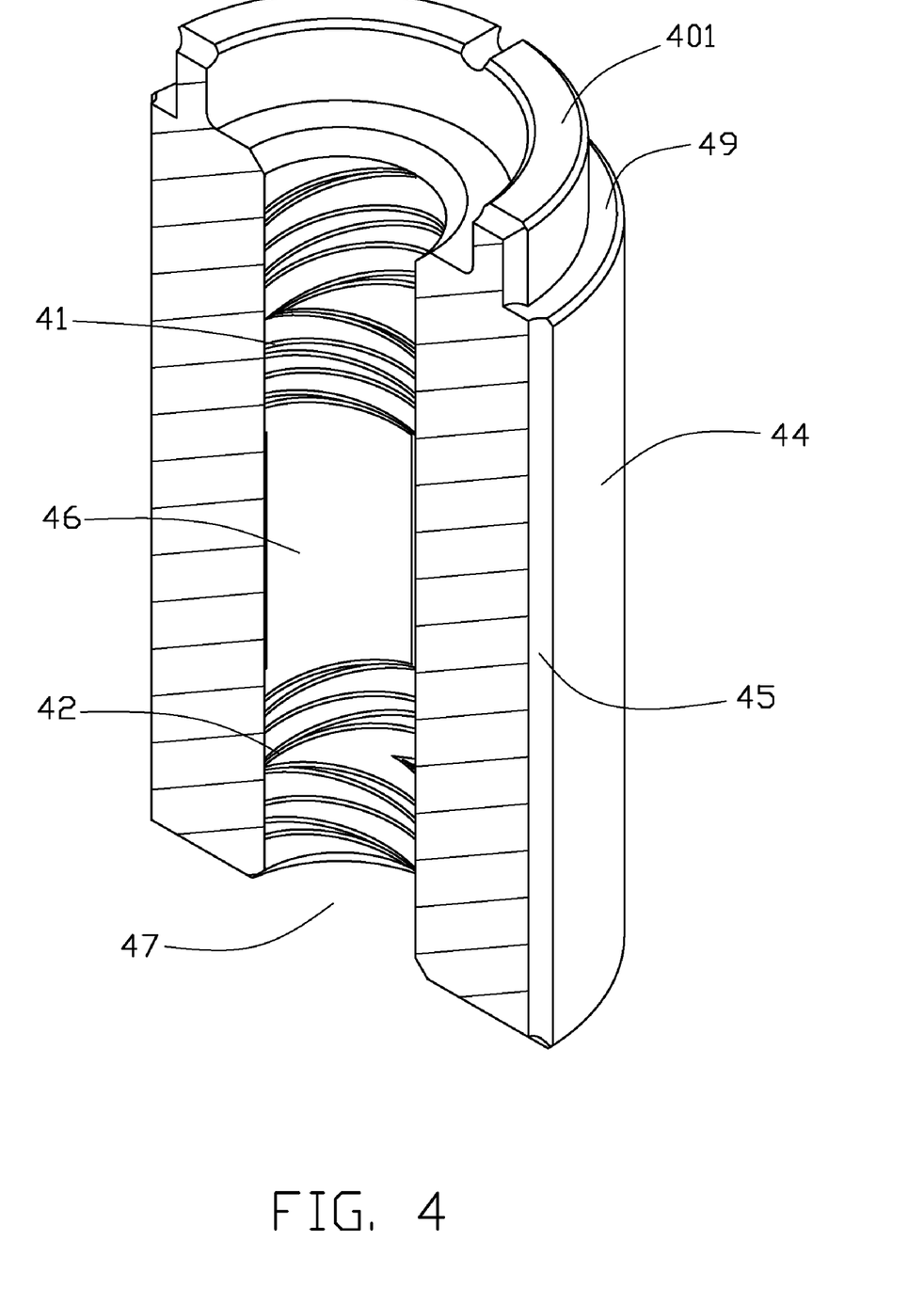
FIG. 4 is an isometric, cross-sectional view of a bearing of the cooling fan of FIG. 1.
Figure 5:
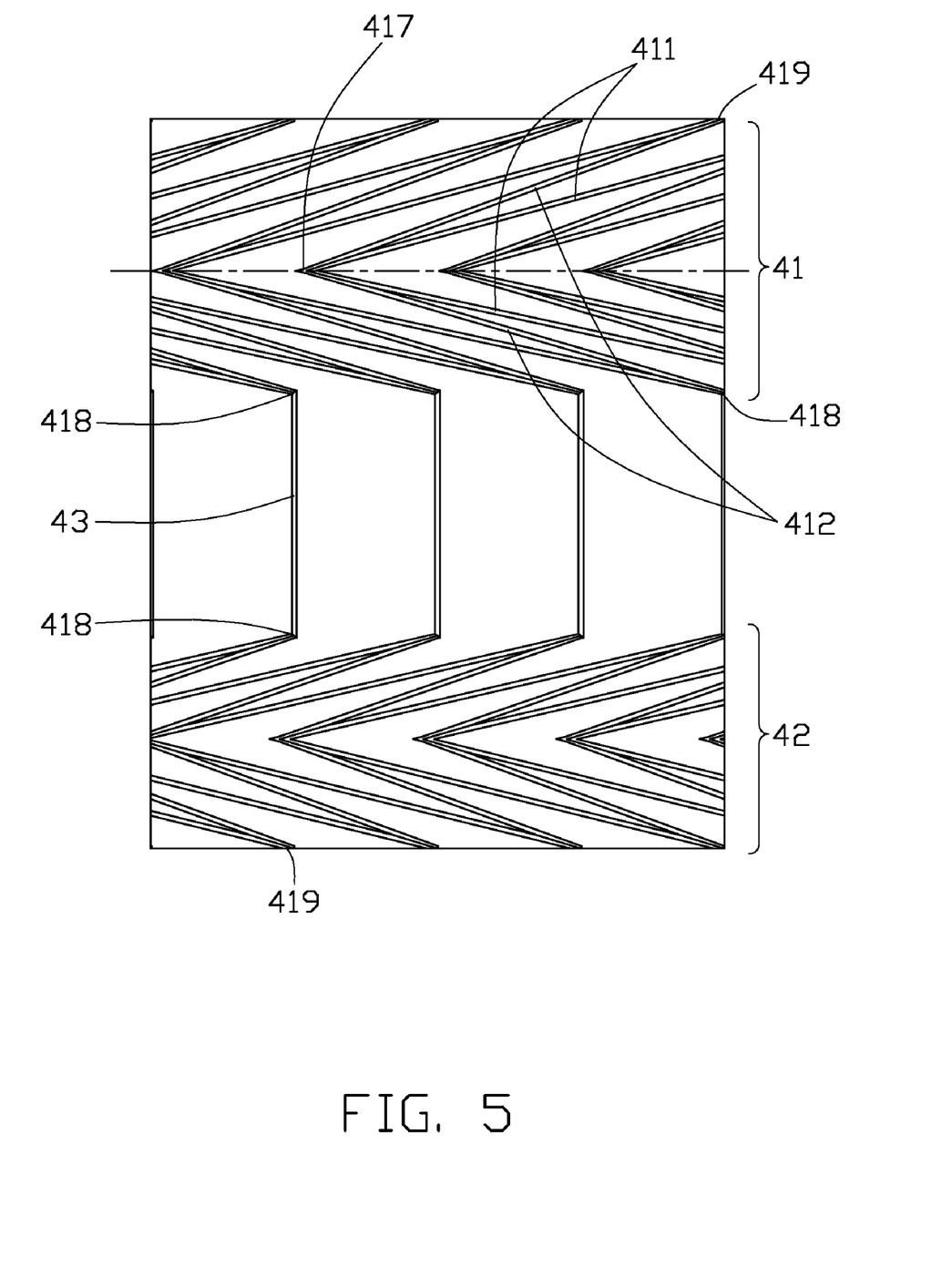
FIG. 5 is an enlarged, unfurled view of a bearing pattern of the bearing of FIG. 4.

As shown in FIGS. 4-5 and also referring to FIG. 1, the bearing 40 is impregnated with lubricant oil for self-lubrication. The bearing 40 is received in the central hole 104 and is arranged on the step 106 of the central tube 102. The bearing 40 defines a bearing hole 47 therein. A plurality of channels 45 are longitudinally defined in an outer surface 44 of the bearing 40 communicating with the bearing hole 47 of the bearing 40 for guiding leaking oil to return back to a bottom end of the bearing 40. A top end 401 of the bearing 40 is lower than the top portion 103 of the central tube 102. The bearing 40 at the top end 401 thereof has an outer diameter less than that of other portion of the bearing 40 and thus a mounting groove 49 is defined in an outer periphery of the bearing 40 at the top end 401 thereof. An end opening 48 that is larger than the bearing hole 47 is defined in an inner surface of the top end 401 of the bearing 40. A pair of bearing patterns 41, 42 are formed on an inner surface 46 of the bearing 40 near the top and bottom ends, respectively. The two bearing patterns 41, 42 are filled with lubricant oil to establish high fluid pressure during operation of the cooling fan.

The two bearing patterns 41, 42 are identical. For the sake of clarity, FIG. 5 shows the bearing pattern 41 unfurled to a flat diagram. The bearing pattern 41 includes a plurality of V-shaped first grooves 411 and second grooves 412 being arranged circumferentially in an alternate fashion along the bearing pattern 41. Each first groove 411 and a neighboring second groove 412 converge at a center area of the bearing pattern 41 to form an inner communication end 417 thereat, and each first groove 411 communicate with the other neighboring second groove 412 at top and bottom edges of the bearing pattern 41, 42 to form top and bottom outer communication ends 419, 418 thereat respectively. By this arrangement, every two adjacent first and second grooves 411, 412 of the bearing pattern 41 are in communication with each other, either at the inner communication ends 417 or at the outer communication ends 418, 419. A plurality of connecting grooves 43 are defined in the inner surface 46 of the bearing 40 between the two bearing patterns 41, 42. Each connecting groove 43 interconnects one bottom communication end 418 of the upper bearing pattern 41 and a corresponding bottom communication end 418 of the lower bearing pattern 42. Thus the two bearing patterns 41, 42 communicate with each other.

Also referring to FIGS. 1-2, the rotor 30 includes a hub 32 forming a shaft seat 321 at a central portion thereof, a plurality of fan blades 34 extending radially from an outer periphery of the hub 32, a permanent magnet 38 adhered to an inner side of the hub 32, and a shaft 36. The magnet 38 is arranged around and spaced from the stator core 22 of the stator 20. The shaft 36 is received with one end thereof in the shaft seat 321 and extends downwardly into the bearing hole 47 of the bearing 40. An annular protrusion 323 around the shaft 36 extends downwardly from an outer periphery of the shaft seat 321 of the hub 32. The protrusion 323 and the shaft 36 cooperatively define an annular concave 324 therebetween.

Figure 3:
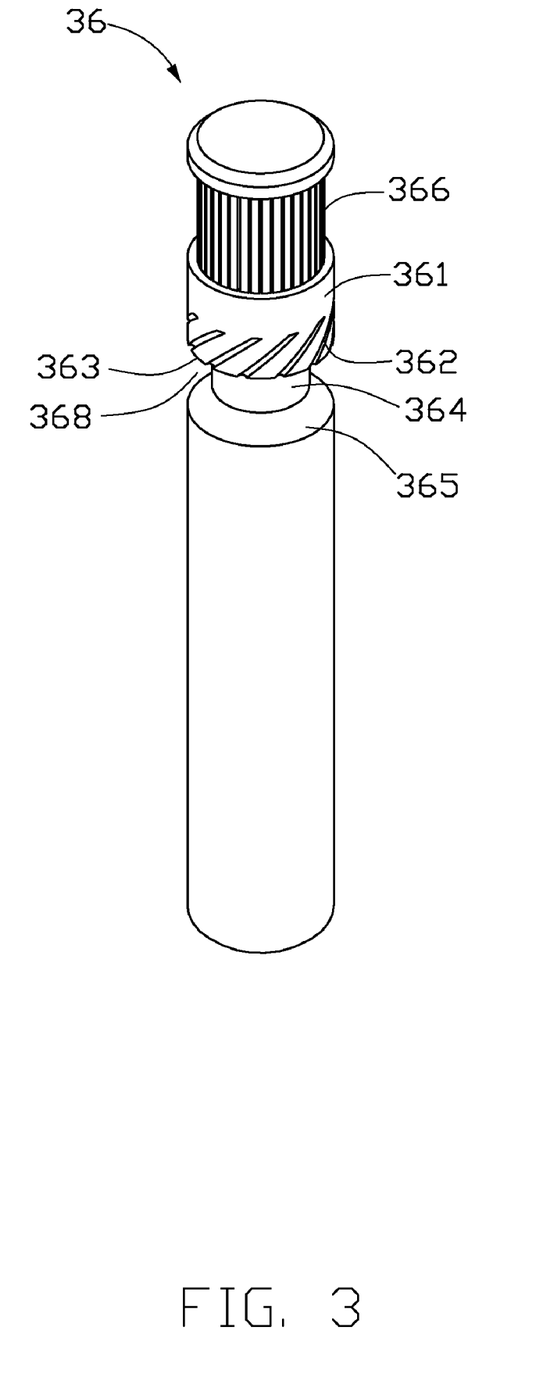
FIG. 3 is an isometric view of a shaft of the cooling fan of FIG. 1.

As shown in FIG. 3, the shaft 36 defines an annular recess 366 near a top end adjacent to the hub 32, and defines an annular groove 368 approximately at ⅔ length of the shaft 36 from a bottom end. A lubricant section 361 is thus formed on the shaft 36 between the groove 368 and the recess 366. The shaft 36 forms a cylinder 364 that is smaller than other portion of the shaft 36 in diameter and located corresponding to an upper portion of the groove 368, and a tapered surface 365 expanding radially outwardly and extending downwardly from the cylinder 364 and located corresponding to a lower portion of the groove 368. The cylinder 364 is orientated perpendicular to a bottom surface 363 of the lubricant section 361 of the shaft 36. A plurality of spiral grooves 362 are defined in the lubricant section 361. The spiral grooves 362 are evenly arranged along a circumferential direction of the shaft 36. The spiral direction of the spiral grooves 362 is the same as a rotary direction of the shaft 36. The spiral grooves 362 are spaced from the recess 366 and a distance is defined between top ends of the spiral grooves 362 and the recess 366. The bottom ends of the spiral grooves 362 extend through the lubricant section 361 and communicate with the groove 368.

The cover 50 is made of powders by sintering. A plurality of pores (not shown) are defined in the cover 50 and communicates with each other. The cover 50 includes an outer ring 502, a flange 503 extending transversely and inwardly from a middle of the outer ring 502, and an inner ring 501 extending perpendicularly and upwardly from an inner periphery of the flange 503. An inner diameter of the inner ring 501 is a little larger than an outer diameter of the shaft 36 and thus a narrow gap (not labeled) is defined between the inner ring 501 of the cover 50 and the shaft 36 to avoid friction generated therebetween during rotation of the cooling fan. An outer diameter of the inner ring 501 is a little smaller than a diameter of the concave 324 of the shaft seat 321. An inner diameter of the outer ring 502 is approximately the same as or a little larger than the outer diameter of the top end 401 of the bearing 40 and is lager than an outer diameter of the protrusion 323 of the shaft seat 321. Thus an annular canal (not labeled) is defined between the inner and outer rings 501, 502 just on the flange 503 for receiving the protrusion 323 of the shaft 36 therein. An outer diameter of the outer ring 502 is approximately the same as the diameter of the recess 105 of the central tube 102.

When assembled, the bearing 40 is mounted into the central tube 102, and the shaft 36 is rotatably received in the bearing 40. The mounting groove 49 of the bearing 40 and the recess 105 of the central tube 102 cooperatively define a space. The cover 50 is mounted in the top portion 103 of the central tube 102 to seal the open end of the central tube 102. The outer ring 502 of the cover 50 inserts into the space, the flange 503 is located over the top end 401 of the bearing 40, and the inner ring 501 is arranged around the lubricant section 361 of the shaft 36. The shaft seat 321 extends into the top portion 103 of the central tube 102. The protrusion 323 of the shaft seat 321 is received in the canal of the cover 50 and is spaced from the flange 503 of the cover 50. The inner ring 501 of the cover 50 is received in the concave 324 of the shaft seat 321 and is spaced from the shaft seat 321. Thus a curved interspace 80 is defined between the shaft seat 321 and the cover 50. An oil buffer region 100 is defined among the shaft 36, the cover 50 and the bearing 40. A locking washer 60 is sandwiched between the top end 401 of the bearing 40 and the flange 503 of the cover 50, and is mounted around and engaged in the groove 368 of the shaft 36 to limit movement of the shaft 36 along an axial direction thereof. A support pad 70 made of high abrasion resistant material is mounted in a bottom end of the central tube 102 to face and supportively engage the shaft 36.

During operation, the rotor 30 is driven to rotate by the interaction of the alternating magnetic field established by the stator 20 and the magnetic field of the rotor 30. When the rotary shaft 36 rotates at a high speed in the bearing 40, the lubricant oil in the bearing patterns 41, 42 establishes dynamic pressures against the rotary shaft 36 so that the rotary shaft 36 does not physically contact the inner surface 46 of the bearing 40 during rotation thereof. It is to be understood that the bearing patterns 41, 42 can be formed on the outer surface of shaft 36 to establish dynamic pressure. Part of the lubricant oil creeps up along the rotating shaft 36 under the influence of the centrifugal force generated by the rotation of the shaft 36 and then escapes to the oil buffer region 100. The groove 368 of the shaft 36 prevents the lubricant oil from continuously creeping up along the shaft 36 and thus most of the lubricant oil is received in the oil buffer region 100 temporarily. The remaining lubricant oil flows up to the lubricant section 361 of the lubricant section 361. The remaining lubricant oil moves toward the middle of the shaft 36 along the spiral grooves 362 for the same directions of the spiral direction of the spiral grooves 362 and the rotation direction of the shaft 36. Furthermore, the cover 50 also can prevent the remaining lubricant oil from leakage out of the bearing 40 through the narrow gap. When the lubricant oil flows out the bearing 40 through the gap between the cover 50 and the shaft 36, as the cover 50 and the shaft seat 321 form the curved interspace 80 therebetween, a flowing resistance of the leaking lubricant oil increases and an energy of the leaking lubricant oil reduces. The leaking lubricant oil thus can not easily and quickly flowing out the interspace 80. On the other hand, as the cover 50 has a plurality of pores, the cover 50 can absorb the leaking lubricant oil of the interspace 80 thereinto and then the leaking lubricant oil can flow back to the bearing 40 by a capillary force of the pores. Thus, the lubricant oil is kept from leaking out of the bearing 40. Good lubrication of the bearing 40 and the shaft 36 is thus consistently maintained, thereby improving the quality and life-span of the cooling fan.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A cooling fan comprising:
   a fan housing having a central tube extending upwardly therefrom;
   a bearing received in the central tube, and defining a bearing hole therein;
   a stator mounted around the central tube;
   a rotor comprising a hub, a plurality of blades extending outwardly from the hub, and a shaft extending downwardly from the hub into the bearing hole of the bearing; and
   a cover mounted around the shaft and arranged on the bearing to seal a top end of the bearing, the cover being made of powders by sintering;
   wherein a shaft seat is formed at a center of the hub for receiving a top end of the shaft therein, the shaft seat having an annular protrusion extending downwardly from an outer periphery thereof, the cover comprising an outer ring, an inner ring and a flange interconnecting the inner and outer rings, a canal being defined between the inner and outer rings over the flange, the protrusion of the shaft seat extending into the canal of the cover, and a curved interspace being defined between the cover and the shaft seat; and
   wherein an annular groove is defined in an outer circumferential surface of the shaft near the top end configured for preventing lubricant oil from continuously creeping up along the shaft during operation of the cooling fan, and the inner ring of the cover abuts the outer circumferential surface of the shaft at a position above the annular groove.

2. The cooling fan of claim 1, wherein a concave is defined in the shaft seat and surrounded by the protrusion, the inner ring of the cover extending into the concave of the shaft seat.

3. The cooling fan of claim 1, wherein the bearing defines a mounting groove in an outer periphery of a top end of the bearing, the outer ring of the cover extending into the mounting groove of the bearing, and the flange of the cover being arranged on the top end of the bearing.

4. The cooling fan of claim 3, wherein a recess is defined in the top portion of the central tube, and the recess and the mounting groove cooperatively form a space, the outer ring of the cover being received in the space, the shaft seat and the protrusion around the shaft seat extending into the space and being located over the cover.

5. The cooling fan of claim 1, wherein the outer circumferential surface of the shaft at the position above the annular groove has a plurality of spiral grooves evenly arranged along a circumferential direction of the shaft, bottom edges of the spiral grooves intersecting the annular groove, a spiral direction of the spiral grooves being the same as a rotary direction of the shaft, the inner ring of the cover attached to the shaft at the spiral grooves of the shaft.

6. The cooling fan of claim 5, wherein the shaft forms a cylinder that is smaller than other portions of the shaft in diameter and located corresponding to an upper portion of the groove, and a tapered surface expanding radially and extending downwardly from the cylinder and located corresponding to a lower portion of the groove.

7. The cooling fan of claim 1, wherein a bearing pattern is defined in one of an inner surface of the bearing and an outer surface of the shaft to establish dynamic pressure, the bearing pattern comprising a plurality of V-shaped first grooves and second grooves arranged circumferentially in an alternate fashion, each first groove and a neighboring second groove intersecting at a center area of the bearing pattern and each first groove intersecting the other neighboring second groove at top and bottom edges of the bearing pattern, each first groove having a length being different from that of the second groove.

8. A motor comprising:
   a base having a central tube extending upwardly therefrom;
   a bearing received in the central tube, and defining a bearing hole therein;
   a stator mounted around the central tube;
   a rotary shaft extending into the bearing hole of the bearing; and
   a cover being received in a top portion of the central tube and sealing a top end of the bearing, the cover being made of powders by sintering and having a plurality of pores to generate capillary force;
   wherein a shaft seat is connected to a top end of the shaft and is received in the top portion of the central tube, a curved interspace being defined between the cover and the shaft seat; and
   wherein the shaft seat has an annular protrusion extending downwardly from an outer periphery thereof, and a concave is defined in the shaft seat and is surrounded by the protrusion, the cover comprising an outer ring, an inner ring and a flange interconnecting the inner and outer rings, a canal being defined between the inner and outer rings over the flange, the protrusion of the shaft seat extending into the canal of the cover, and the inner ring of the cover extending into the concave of the shaft seat; and
   wherein an annular groove is defined in an outer circumferential surface of the shaft near the top end thereof configured for preventing lubricant oil from continuously creeping up along the shaft, and the inner ring of the cover abuts the outer circumferential surface of the shaft at a position above the annular groove.

9. The motor of claim 8, wherein the bearing defines a mounting groove in an outer periphery of a top end of the bearing, and a recess is defined in the top portion of the central tube, the recess and the mounting groove cooperatively forming a space, the outer ring of the cover being received in the space.

10. The motor of claim 8, wherein the outer circumferential surface of the shaft at the position above the annular groove has a plurality of spiral grooves evenly arranged along a circumferential direction of the shaft, bottom edges of the spiral grooves intersecting the annular groove, a spiral direction of the spiral grooves being the same as a rotary direction of the shaft, the inner ring of the cover attached to the shaft at the spiral grooves of the shaft.

11. The cooling fan of claim 8, wherein a bearing pattern is defined in one of an inner surface of the bearing and an outer surface of the shaft to establish dynamic pressure, the bearing pattern comprising a plurality of V-shaped first grooves and second grooves arranged circumferentially in an alternate fashion, each first groove and a neighboring second groove intersecting at a center area of the bearing pattern and each first groove intersecting the other neighboring second groove at top and bottom edges of the bearing pattern.

12. The cooling fan of claim 11, wherein each first groove has a length being different from that of the second groove.

* * * * *